United States Patent
Pignataro et al.

(10) Patent No.: US 11,128,546 B2
(45) Date of Patent: Sep. 21, 2021

(54) DYNAMIC BYPASS TUNNEL INSTANTIATION BASED ON ANALYTICAL HEALTH RISK HEATMAP

(71) Applicant: Cisco Technology, Inc., San Jose, CA (US)

(72) Inventors: Carlos M. Pignataro, Cary, NC (US); Nagendra Kumar Nainar, Morrisville, NC (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 242 days.

(21) Appl. No.: 15/834,291

(22) Filed: Dec. 7, 2017

(65) Prior Publication Data

US 2019/0182127 A1 Jun. 13, 2019

(51) Int. Cl.
*G06F 15/173* (2006.01)
*H04L 12/24* (2006.01)
*G06N 20/00* (2019.01)

(52) U.S. Cl.
CPC ......... *H04L 41/5025* (2013.01); *G06N 20/00* (2019.01); *H04L 41/0823* (2013.01); *H04L 41/0853* (2013.01); *H04L 41/147* (2013.01); *H04L 41/046* (2013.01); *H04L 41/12* (2013.01); *H04L 41/5009* (2013.01)

(58) Field of Classification Search
CPC .................. H04L 41/5025; H04L 41/0853
See application file for complete search history.

(56) References Cited

U.S. PATENT DOCUMENTS 8,239,568 B2 * 8/2012 Stachura ............. H04L 41/0213
709/236
8,433,667 B2 8/2013 Mahajan et al.
(Continued)

FOREIGN PATENT DOCUMENTS

EP 0854606 B1 10/2004

OTHER PUBLICATIONS

Gao, et al., "Link Prediction Methods and Their Accuracy for Different Social Networks and Network Metrics", ISO, Scientific Programming manuscript no. output, Dec. 1, 2014.
(Continued)

*Primary Examiner* — Hua Fan
(74) *Attorney, Agent, or Firm* — Edell, Shapiro & Finnan, LLC

(57) ABSTRACT

A method is provided to generate a network risk heatmap. The method includes obtaining first data related to technical support and operations issues of a network that includes a plurality of network elements and second data related to updates and configurations of the network. The method involves analyzing the first data and the second to generate a device risk heatmap rule that determines a level of predictive failure risk as a function of network telemetry data indicative of real-time operations of the network. The method further includes applying the device risk heatmap rule to network telemetry data collected from the network to create a network heatmap representing a level of predictive failure risk for the plurality of network elements in the network. The method then includes instantiating a path or tunnel in the network based on the network heatmap.

20 Claims, 5 Drawing Sheets

(56) References Cited

U.S. PATENT DOCUMENTS

| | | |
|---|---|---|
| 8,868,766 B1 * | 10/2014 | Theimer ................. H04L 67/32 |
| | | 709/229 |
| 9,338,065 B2 | 5/2016 | Vasseur et al. |
| 9,369,351 B2 | 6/2016 | Di Pietro et al. |
| 9,374,281 B2 | 6/2016 | Dasgupta et al. |
| 9,426,040 B2 | 8/2016 | Vasseur et al. |
| 9,473,364 B2 | 10/2016 | Vasseur et al. |
| 9,485,153 B2 | 11/2016 | Vasseur et al. |
| 9,491,076 B2 | 11/2016 | Mermoud et al. |
| 9,774,522 B2 | 9/2017 | Vassseur et al. |
| 2015/0195192 A1 * | 7/2015 | Vasseur ............... G06F 11/2007 |
| | | 714/47.3 |
| 2015/0227868 A1 | 8/2015 | Saraf et al. |
| 2015/0333953 A1 | 11/2015 | Vasseur et al. |
| 2016/0080202 A1 * | 3/2016 | Zhang .................... H04L 41/12 |
| | | 709/223 |
| 2016/0124957 A1 | 5/2016 | Rayes et al. |
| 2016/0164903 A1 | 6/2016 | Murynets et al. |
| 2017/0019315 A1 | 1/2017 | Tapia et al. |
| 2018/0006878 A1 * | 1/2018 | Raman ................. G06F 11/3433 |

OTHER PUBLICATIONS

F. Brockners, et al., "Data Fields for In-situ OAM", draft-ietf-ippm-ioam-data-01, ippm, Oct. 30, 2017, 29 pgs.
F. Brockners, et al., "Data Fields for In-situ OAM", draft-ietf-ippm-ioam-data-00, ippm, Sep. 4, 2017, 29 pgs.

* cited by examiner

DYNAMIC BYPASS TUNNEL INSTANTIATION BASED ON ANALYTICAL HEALTH RISK HEATMAP

TECHNICAL FIELD

The present disclosure relates to network management and performance.

BACKGROUND

In the field of networking, there is a recent trend in which customers are demanding the network to deliver Service Level Agreement (SLA) constrained service delivery. It is no surprise that a service provider's top-initiative is called "Infinite Nines", as it summarizes the growing need and importance for availability.

One of the key components for such SLA constrained connectivity is to steer the traffic over network path that satisfies the SLA requirement on a per-flow basis. This is currently achieved by leveraging Internet Protocol/Multi-protocol Label Switching (IP/MPLS) Traffic Engineering. However, current solutions are reactive in nature and is not proactive, predictive or pre-emptive.

Further, current traffic steering models are fairly static. Through the use of capacity planning and some performance management static views, a set of tunnels is instantiated. This only changes when there is an outage in the network, which obviously, is too late.

DESCRIPTION OF EXAMPLE EMBODIMENTS

Overview

In one embodiment, a method is provided to generate a network risk heatmap. The method includes obtaining first data related to technical support and operations issues of a network that includes a plurality of network elements and second data related to updates and configurations of the network. The method involves analyzing the first data and the second data to generate a device risk heatmap rule that determines a level of predictive failure risk as a function of network telemetry data indicative of real-time operations of the network. The method further includes applying the device risk heatmap rule to network telemetry data collected from the network to create a network heatmap representing a level of predictive failure risk for the plurality of network elements in the network. The method then includes instantiating a path or tunnel in the network based on the network heatmap.

Example Embodiments

Presented herein is a (two-pronged) machine learning method that leverages first data related to technical support and operations of a network and second data related to updates and configurations of the network, for a given customer network as well as across large numbers of customer network deployments. The method creates a topology risk heat map (including network elements, nodes and links, etc.). The topology risk heat map is in turn used along with the real-time network telemetry data to predict potential device/link failure and dynamically create redirect tunnels to bypass a predicted failure node/zone.

The first data is also referred to and known as technical assistance (TAC) data and in general is accumulated from technical support and operations issues reported about the customer network. The first data arises when problems occur in the network, such failures or outages. The second data results from professional services applied to a network to optimize performance of the network through software updates to network equipment and configurations of the network equipment to make the network run better or do more for the customer. The first data and second data are supplied to a machine learning algorithm. Output from the machine learning analysis is supplied to a client agent running on a customer device in the customer network. The client agent generates network risk heatmap for the customer network. Using the network risk heatmap, a network controller or other path computing element (PCE) in the customer network can perform traffic engineering tunneling to avoid use of a node/link always or for certain (critical) traffic.

Figure 1:
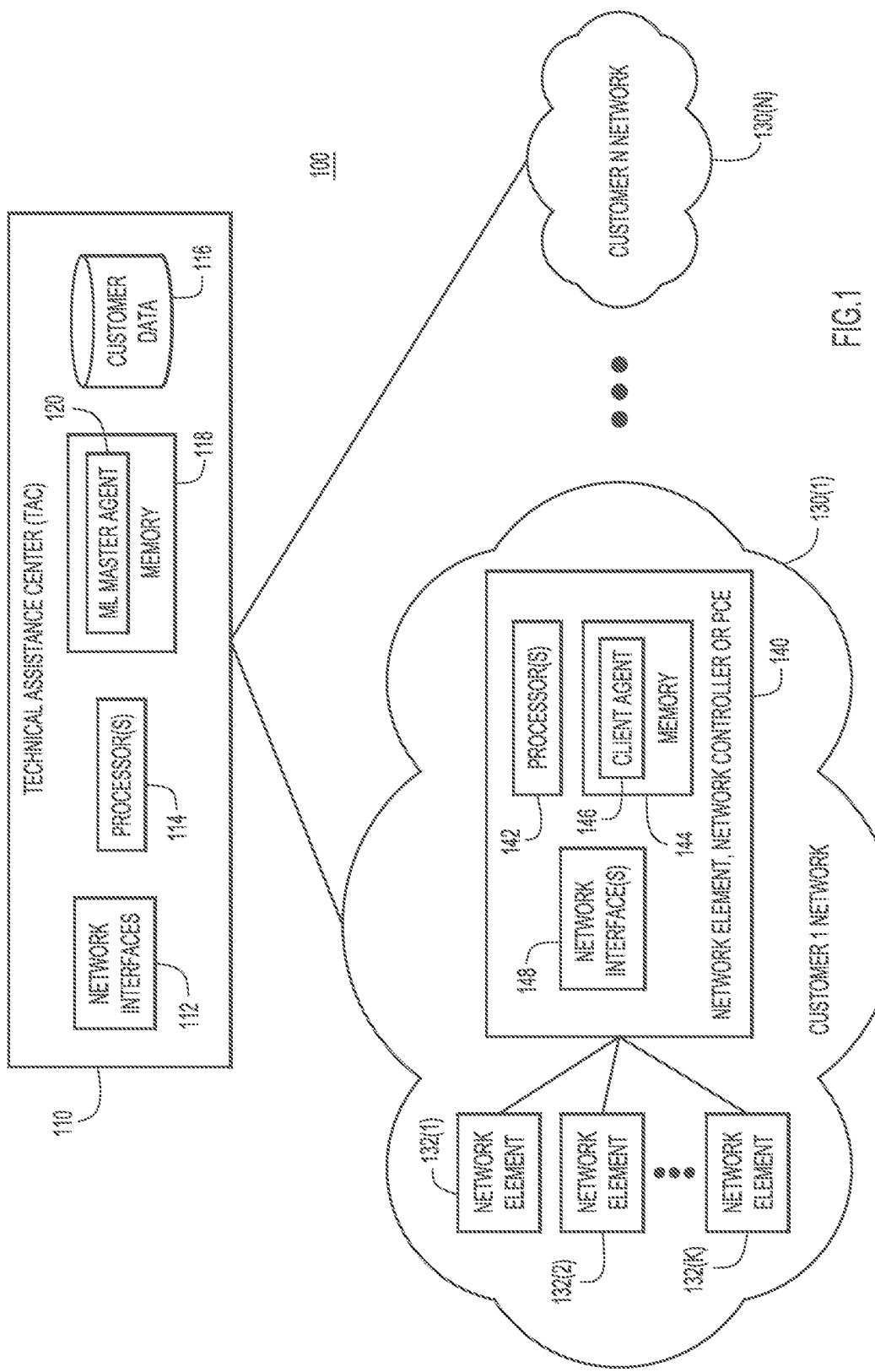
FIG. 1 is block diagram of a system configured to generate a network risk heatmap by performing analysis on support and operations data as well as migration and optimization data, according to an example embodiment.

Reference is now made to FIG. 1. FIG. 1 shows a block diagram of a system 100 that includes a TAC 110 that is in communication with one or more customer networks, shown at reference numerals 130(1)-130(N). The TAC 110 includes network interfaces 112 (e.g., one or more network interface cards) to enable network communication with the customer networks 130(1)-130(N), one or more processor(s) 114, a database 116 of customer data, memory 118 that stores instructions for one or more software programs executed by the processor(s) 114, such as software instructions for a machine learning (ML) master agent 120.

As shown in FIG. 1, in each customer network 130(1)-130(N) there are a plurality of network elements 132(1)-132(K) connected in various topologies. In addition, one or more network elements, or a network controller or PCE shown at 140 may be configured with processing capability to perform operations of a client agent. More specifically, the computing apparatus/entity 140 (whether a network element, network controller or PCE) has connectivity to all the other network elements 132(1)-132(K) and includes one or more processor(s) 142, memory 144 that stores software instructions for, among other functions, client agent 146 and one or more network interfaces 148 that enable network connectivity. The network elements may be switches, routers, network appliances (firewalls, intrusion detection/prevention, etc.) gateways, link aggregation groups, in physical or virtual form, virtual machines, etc.

As explained above, the system 100 performs analytical-based failure/risk prediction by leveraging first data related to customer-specific technical support and operations issues of the customer network and second data related to updates and configurations of the network. A machine learning algorithm executed by the master agent 120 builds a topology risk heatmap specific to the particular customer topology and architecture. The customer network topology may be obtained with protocols, such as the Border Gateway Protocol (BGP) or any other network topology maintenance and reporting techniques now known or hereinafter developed. This in turn will be considered as an input along with local customer network data for prediction by client agent 146 that will be used to trigger dynamic tunnel/path instantiation (end-to-end or redirect tunnels) to enhance network resiliency and efficient load sharing based on network health prediction.

In other words, the system 100 identifies network elements (e.g., nodes, links between nodes, service functions, etc.) which are predicted to most likely fail based on the first data and second data, and based on network telemetry data obtained from the network (reflecting the current operational status of the customer network), to then automatically create traffic engineering tunnels bypassing the node(s) or link(s) more susceptible to failure. The network telemetry data is real-time data received from network elements concerning the operational state of the network elements and links therebetween in the network, as well as flow related parameters for traffic flows passing through the network elements. Examples of telemetry data include NetFlow data, such as flow data and timer based telemetry. Aggregated details about flows may be exported periodically from a network element. Another type of telemetry data is streaming statistics telemetry data in which a network element constantly streams state data. State data for example includes interface statistics, and control plane changes. A network element may constantly stream per-packet flow data and a subset of state data. Details about every packet are collected to provide significant visibility.

Figure 2:
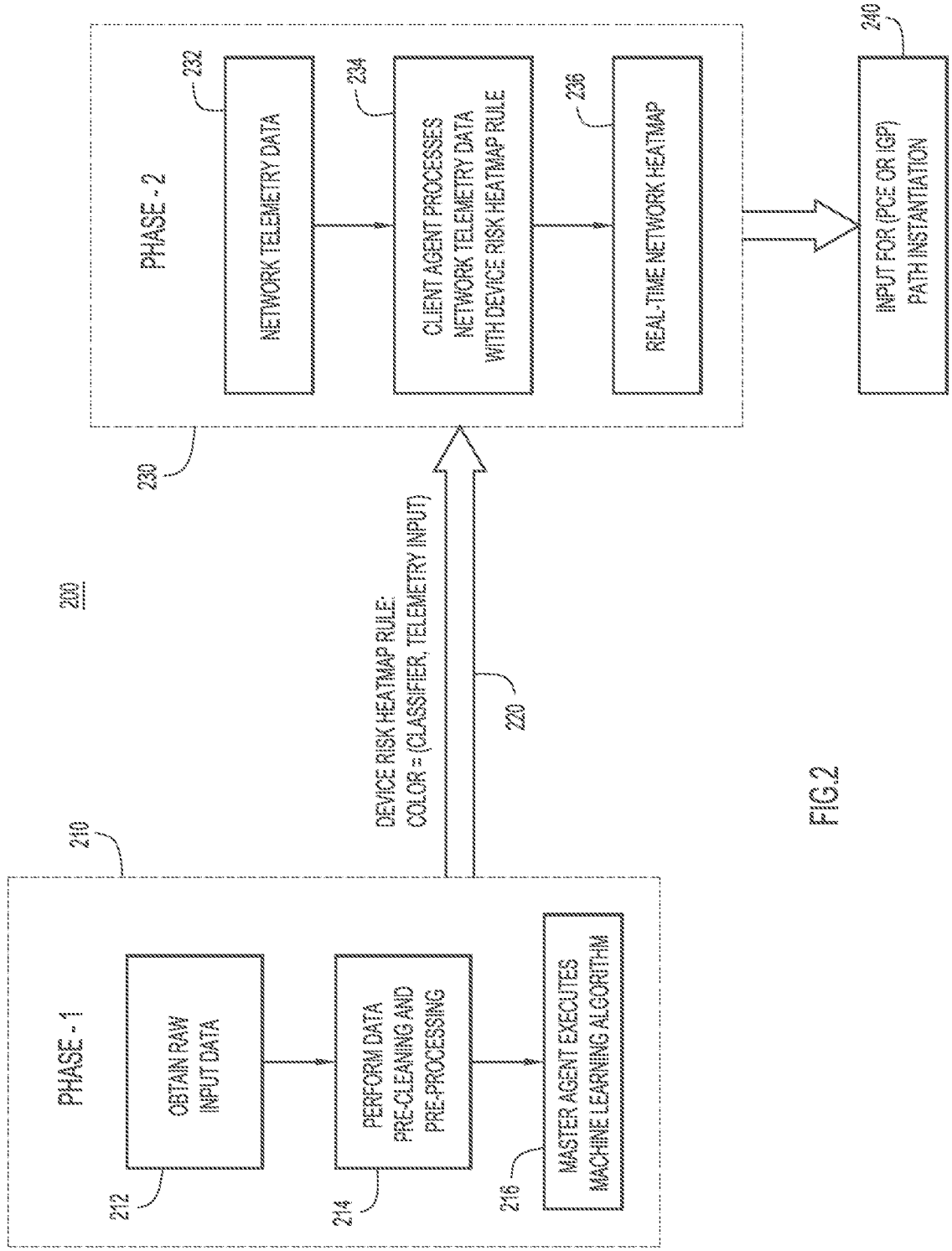
FIG. 2 illustrates an overall operational flow of the system shown in FIG. 1, according to an example embodiment.

Reference is now made to FIG. 2, with continued reference to FIG. 1. FIG. 2 illustrates a flow diagram 200 for the operational flow of the system 100 shown in FIG. 1. The system 100 has two operational phases. The first phase (Phase-1) shown at 210 involves receiving data input and generating heatmap output (likelihood of failure for nodes). The second phase (Phase-2) shown at 230 provides the instantiation of Traffic Engineer (TE) tunnels bypassing the node(s) and/or link(s) likely to fail.

The processing of Phase-1 210 may be performed by the processing capabilities in the TAC 110 remote from the customer network (e.g., customer network 130(1)), such as in the internal cloud of the network equipment vendor or service provider. Phase-1 involves obtaining as input raw data at 212 of the aforementioned first data and second data related to the customer network. The first data related to technical support and operations issues may include, for a given customer network, network topology data, command line interface "show types", log files, diagnostic signature outputs, distributed defect tracking system (DDTS) ("bugs") data, etc. The second data related to updates and configurations of the customer network may include data generated by professional services to improve the performance of the network or make the network do more for the customer, as described above, and including software updates, network equipment configurations, etc. Operation 214 converts the raw input data (the first data and the second data referred to above) to attributes in a data pre-cleaning and pre-processing operation. Specifically, at 214, the raw input data will be pre-cleaned and processed and converted into different variables. In one embodiment, a regular show type will be converted into different resource centric attributes (memory utilization, etc.). Depending on the availability of the log files (depending on the cases opened for a given customer), a non-linear (discrete time) attribute set may be created.

As an example, attribute sets are generated at operation 214. The attribute sets may be related to:

Number of individual networking features;
Platform Hardware/Software specifics;
Operational data (load in packets, load on central processing unit (CPU) in network elements, load on memory of network elements); and
Dispersion and variance of "features".
For example, attribute sets may be of the form:

$$\text{attr1\_set} = (\text{attr1, t1}); (\text{attr1, t2}); (\text{attr1, t3}) \ldots (\text{attr1, tn})$$
$$\text{attr2\_set} = (\text{attr2, t1}); (\text{attr2, t2}); (\text{attr2, t3}) \ldots (\text{attr2, tn})$$
$$\ldots$$

where t1-tn are timestamps.

At 216, the master agent 120 executes a machine learning algorithm to learn/derive a topology-based customer-centric risk heatmap indicating risks on nodes and links in the customer's network. Thus, the attribute sets generated at 214 are fed as input to an unsupervised machine learning algorithm along with other internal data sets (intellectual capital sets, alerts, diagnostic signature outputs, Product Security Incident Response Team (PSIRT) alerts, etc.). This will be used to create a Device Risk Heatmap Rule/Formula which may take the form:

$$\text{Color} = (\text{classifier}, \text{telemetry\_input})$$

where "classifier" is a variable composed of multiple input fixed values (network events) derived by the Device Risk Heatmap Rule/Formula; and "telemetry_input" is the event/real-time data (Netflow data, show output, traffic rate etc.) locally collected by customer network controller 140.

The machine learning algorithm at 216 is an unsupervised learning algorithm. The attr_set and the diagnostic signatures or other data referred to above are used to create the classifier. For example, attr_set of memory utilization that shows a linear increase at t1, t2 . . . and causing a catastrophic issue at timestamp tn will be created as a classifier. In this example, the classifier will be memory utilization incrementing at certain rate.

Color=(classifier, telemetry_input) will be used to identify the risk heat map. Telemetry_input is real-time telemetry collected by the network controller 140 and is used for comparison by the classifier to determine, in one example, whether the memory utilization increasing at certain rate. If the classifier result is "no", the output heatmap Color will be green. If the classifier result is "yes", the output heatmap Color will be Red.

In other words, the "color" for a given network element in the heatmap is determined based on a classifier that operates on multiple input fixed values and real-time network telemetry data obtained within the customer network.

At 220, data describing the above derived Device Risk Heatmap Rule is sent to the customer's network for processing by the client agent 146. Customer with relevant information (like node details). Communication from master agent to client agent may be conditional, such as if conditions 1 and 2 are met, there may be a failure occurring.

As explained above, Phase-2 at 230 is performed in the customer network/premises. At 234, the client agent 146 receives as input locally collected network telemetry data at 232 and uses the Device Risk Heatmap Rule/Formula received from the master agent at 220 to create a real-time device heatmap indicating the vulnerability to failure of any node in the customer network. Examples of the telemetry data are described above.

The client agent 146 uses a prediction algorithm based on the Device Risk Heatmap Rule to classify nodes in a customer's network into different colors. For example, the colors may be: Green=Safe, Orange=Bad, Red=Worse, Black=Avoid.

A real-time network heatmap is generated at 236 based on an aggregation of the device heatmaps for individual devices in the customer network, generated at 234. This heatmap is a predictive indication, reflecting the risk of a failure in the future.

The real-time network heatmap may be used for various network resiliency purposes. As shown at 240 in FIG. 2, the network heatmap may be used as input for path/tunnel instantiation, either to a Path Computing Element (PCE) or to a protocol-based path instantiation process, such as the Interior Gateway Protocol (IGP). For example, it may be used as a trigger to instantiate dynamic a "Redirect Tunnel" to bypass one or more transit nodes which are marked as having a high risk of failure and to divert all or only a subset of all network traffic, e.g., certain critical traffic, depending on the color. As another example, a PCE controller upon receiving an end-to-end path instantiation request will use the network heatmap as one input along with the topology information, traffic requirements etc., for path instantiation.

Figure 3:
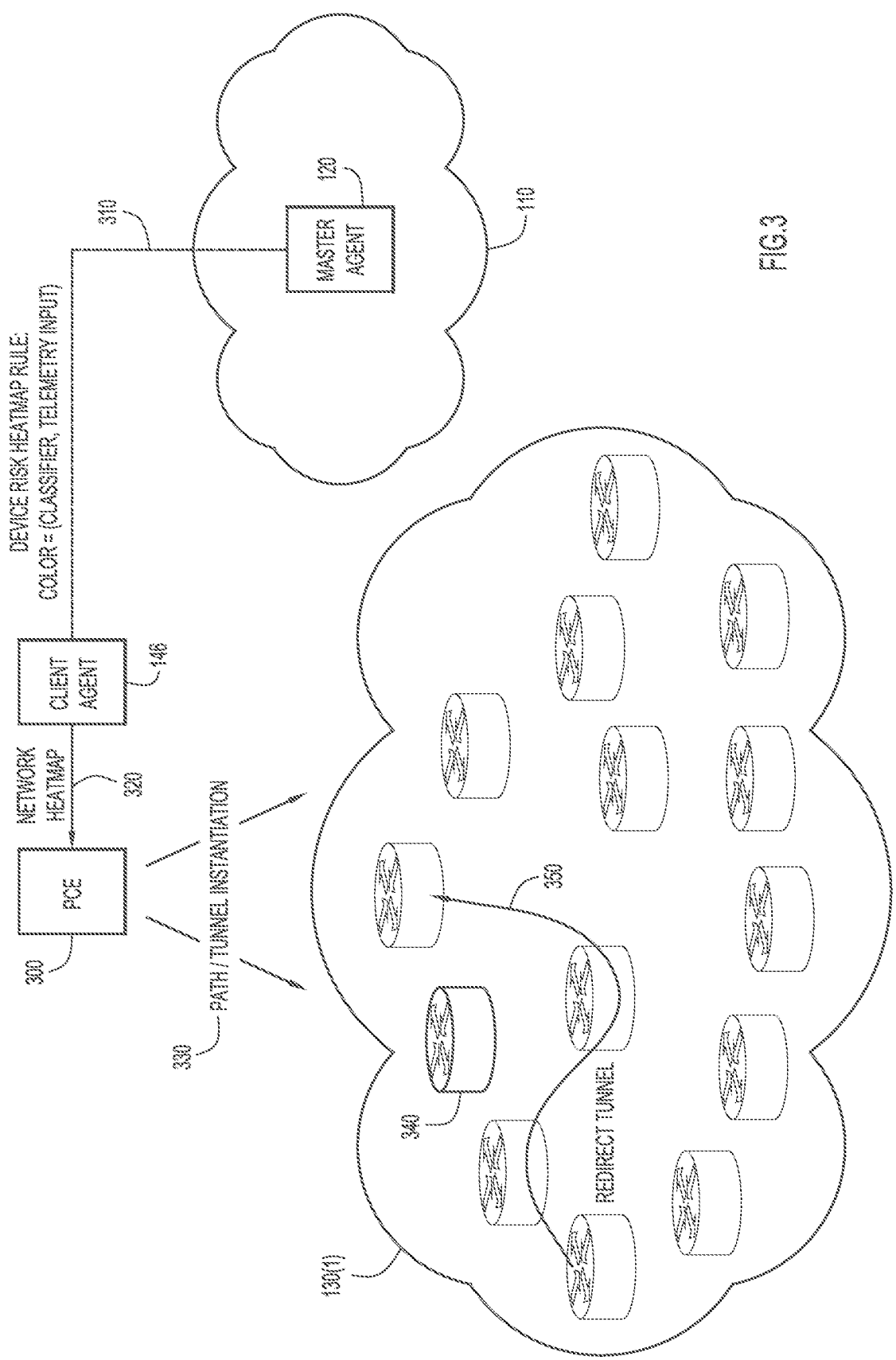
FIG. 3 is a diagram illustrating an example use case of the network risk heatmap to perform dynamic bypass tunnel instantiation, according to an example embodiment.
Figure 4:
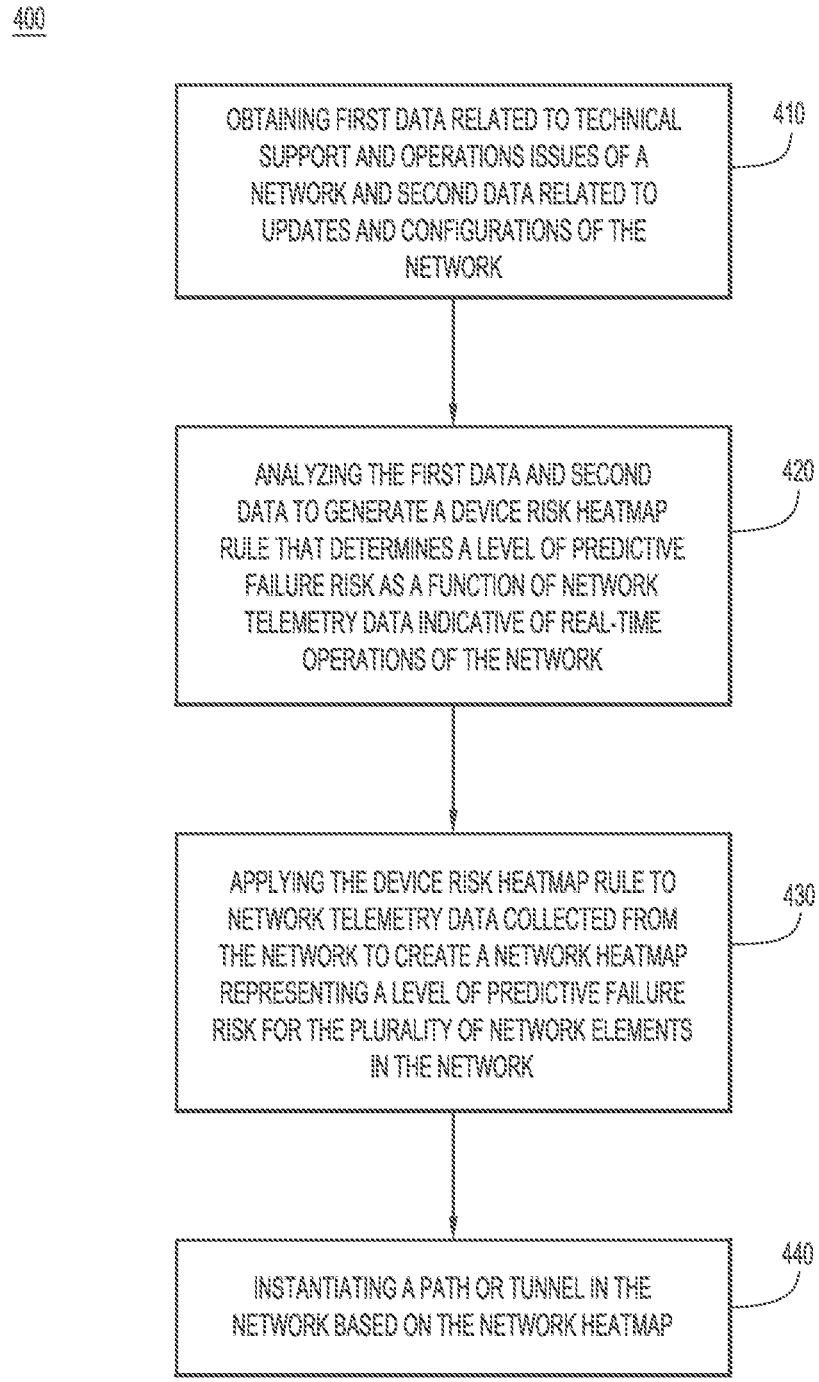
FIG. 4 is a flow chart illustrating operations of a method according to an example embodiment.

Reference is made to FIG. 3 for one example of the use of the network heatmap described in connection with FIG. 2. In this example, there is a PCE 300 that may be an entity separate from the entity that runs the master agent 146. At 310, the master agent 120 sends to the client agent 146 data describing a Device Risk Heatmap Rule. The client agent 146 generates a network heatmap based on application of the Device Risk Heatmap Rule and, at 320, sends the network heat map to the PCE 300. The PCE 300 uses the network heatmap for path/tunnel instantiation as shown at 330. For example, network element 340 is indicated as having a Color=Red. Thus, the PCE 300 redirects a path 350 around network element 340 in customer network 130(1) as shown in FIG. 3.

Turning now to FIG. 3, a flow chart is shown depicting, at a high level, operations of a process 400 in accordance with an example embodiment, based on the concepts described above in connection with FIGS. 1-3. At 410, the process involves obtaining first data related to technical support and operations issues of a network that includes a plurality of network elements, and second data related to updates and configurations of the network. At 420, the process includes analyzing the first data and the second data to generate a device risk heatmap rule that determines a level of predictive failure risk as a function of network telemetry data indicative of real-time operations of the network. The first data may include topology data describing a topology of the network, log files, diagnostic signatures, defect tracking system data, and command line interface show types, and the second data may include data pertaining to updates and configurations of the network elements to optimize performance of the network or provide new features in the network.

At 430, the process includes applying the device risk heatmap rule to network telemetry data collected from the network to create a network heatmap representing a level of predictive failure risk for the plurality of network elements in the network. At 440, the process involves instantiating a path or tunnel in the network based on the network heatmap.

The analyzing operation 420 may involve performing unsupervised machine learning analysis of the technical assistance center data. The technical assistance center data may include topology data of the network, log files, digital signatures, defect tracking system data, command line interface show types, etc.

As described above in connection with FIG. 2, the process 400 may further include pre-processing the first data and the second data to produce attribute sets related to one or more of: number of individual networking features; hardware/software specifics of a network element; network element operational data indicating one or more or of load in packets, load on a central processing unit, or load on memory; or dispersion and variances of one or more networking features.

Further, as described above in connection with FIG. 2, the device risk heatmap rule may a color classifier function that generates a failure risk indication color as a function of network telemetry data.

As shown and described with respect to FIG. 2, operations 410 and 420 may be performed by a computing apparatus within a technical assistance center or network support center remote from the network that provides technical support to customer networks that include a plurality of network elements. Operations 430 and 440 may be performed by a computing apparatus within the network, e.g., a customer network. In this case, the computing apparatus in the technical assistance center may send to the computing apparatus in the network, data describing the device risk heatmap rule.

The operation 440 of instantiating may include creating the path or tunnel in the network so as to avoid one or more network elements in the network that have an unacceptable level of predictive failure risk. In one example, the instantiating operation includes creating the path or tunnel in the network so that all network traffic or a subset (certain high-priority or critical traffic) of all network traffic avoids the one or more network elements in the network that have an unacceptable level of predictive failure risk.

Figure 5:
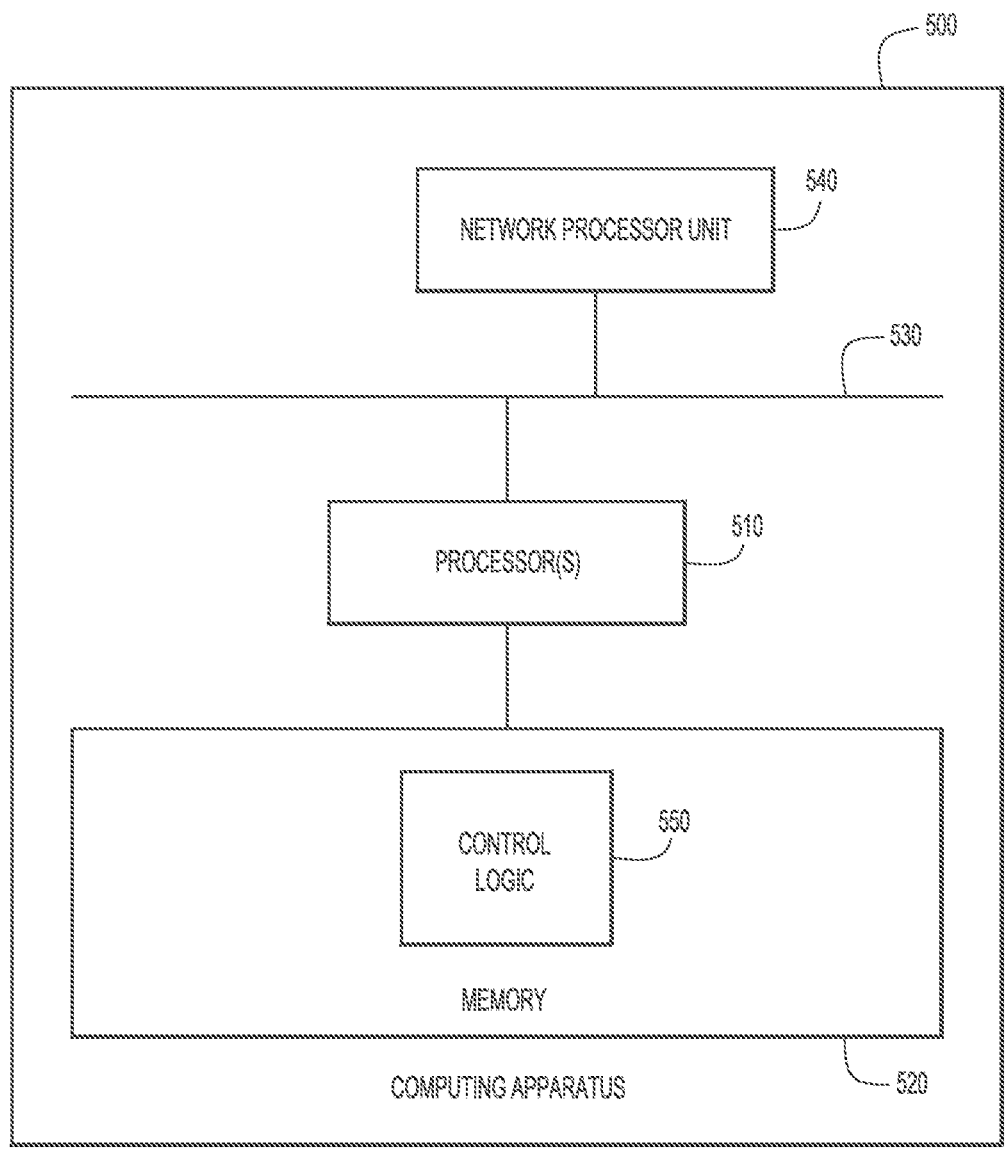
FIG. 5 is a block diagram of a computing apparatus that is configured to perform computations as part of the method depicted in FIG. 4, according to an example embodiment.

Reference is now made to FIG. 5. FIG. 5 illustrates a block diagram of a computing apparatus 500 that may perform the functions of the computing apparatus in the technical assistance center and the computing apparatus in the customer network, e.g., a network controller or PCE, described herein. The computing apparatus 500 includes one or more processors 510, memory 520, a bus 530 and a network interface unit 540, such as one or more network interface cards that enable network connectivity. The memory 520 stores instructions for control logic 550, that when executed by the processor 510, cause the processor 510 to operations described herein in connection with FIGS. 1-4.

The memory 510 may include read only memory (ROM), random access memory (RAM), magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

In summary, a system and method are provided to analytical based failure/risk prediction by leveraging first data related to technical support and operational issues of a network, and second data related to updates and performance optimization configurations of the network. The first data and second data set are fed into a machine learning algorithm (by master agent) to build a topology risk heatmap specific to the particular customer topology and architecture.

This data is used as input along with local customer network data (real-time telemetry data) for prediction (by client agent) to trigger dynamic tunnel/path instantiation (end-to-end or redirect tunnels) in order to enhance network resiliency and efficient load sharing based on network health prediction. One goal is to build bypass Traffic Engineering (TE) Tunnels that avoid high-risk network elements (nodes, links, link aggregation groups, virtual machines, etc.).

In summary, in one form, a computer-implemented method is provided comprising: obtaining first data related to technical support and operations issues of a network that includes a plurality of network elements and second data related to updates and configurations of the network; analyzing the first data and the second data to generate a device risk heatmap rule that determines a level of predictive failure risk as a function of network telemetry data indicative of real-time operations of the network; applying the device risk heatmap rule to network telemetry data collected from the network to create a network heatmap representing a level of predictive failure risk for the plurality of network elements in the network; and instantiating a path or tunnel in the network based on the network heatmap.

In another form, a system is provided comprising: a first computing apparatus, wherein the first computing apparatus is configured to: obtain first data related to technical support and operations issues of a network that includes a plurality of network elements and second data related updates and configurations of the network; and analyze the first data and the second data to generate a device risk heatmap rule that determines a level of predictive failure risk as a function of network telemetry data indicative of real-time operations of the network; and a second computing apparatus associated with the network, wherein the second computing apparatus is configured to: receive from the first computing apparatus data describing the device risk heatmap rule; apply the device risk heatmap rule to network telemetry data collected from the network to create a network heatmap representing a level of predictive failure risk for the plurality of network elements in the network; and cause a path or tunnel in the network to be instantiated based on the network heatmap.

In still another form, an apparatus is provided comprising: a network interface configured to enable network communications; a memory; a processor coupled to the network interface and to the memory, wherein the processor is configured to: collect network telemetry data indicative of real-time operations of a network that includes a plurality of network elements; apply to the network telemetry data a device risk heatmap rule to produce a network heatmap, wherein the device risk heatmap rule determines a level of predictive failure risk as a function of network telemetry data indicative of real-time operations of the network, wherein the device risk heatmap rule is generated from first data related to technical support and operations issues of a network that includes a plurality of network elements and second data related to updates and configurations of the network; and instantiate a path or tunnel in the network based on the network heatmap.

In still another form, one or more non-transitory computer readable storage media are provided that are encoded with instructions which, when executed by a processor, cause the processor to perform operations including: obtaining first data related to technical support and operations issues of a network that includes a plurality of network elements and second data related to updates and configurations of the network; analyzing the first data and the second data to generate a device risk heatmap rule that determines a level of predictive failure risk as a function of network telemetry data indicative of real-time operations of the network; applying the device risk heatmap rule to network telemetry data collected from the network to create a network heatmap representing a level of predictive failure risk for the plurality of network elements in the network; and instantiating a path or tunnel in the network based on the network heatmap.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   obtaining first data related to technical support and operations issues of a network that includes a plurality of network elements and second data related to updates and configurations of the network, wherein the first data includes one or more of log files, diagnostic signatures, defect tracking system data, and command line interface show types;
   converting the first data and the second data into a plurality of different variables representing attribute sets, at least one attribute set being a non-linear attribute set related to dispersion and variance of a networking feature;
   analyzing the attribute sets to generate a device risk heatmap rule that determines a level of predictive failure risk as a function of network telemetry data indicative of real-time operations of the network;
   applying the device risk heatmap rule to network telemetry data collected from the network to generate a plurality of individual device heatmaps, each respectively corresponding to one of the plurality of network elements;
   aggregating the individual device heatmaps to create a network heatmap representing a level of predictive failure risk for each of the plurality of network elements in the network and each of a plurality of links in the network, the network heatmap being specific to a topology and architecture of the network; and
   instantiating a path or tunnel in the network based on the network heatmap.

2. The method of claim 1, wherein instantiating includes creating the path or tunnel in the network so as to avoid one or more network elements in the network that have an unacceptable level of predictive failure risk.

3. The method of claim 2, wherein instantiating includes creating the path or tunnel in the network so that all network traffic or a subset of all network traffic avoids the one or more network elements in the network that have the unacceptable level of predictive failure risk, based on the network heatmap and traffic requirements.

4. The method of claim 1, wherein analyzing comprises performing machine learning analysis using as input the attribute sets.

5. The method of claim 1, wherein the second data includes data pertaining to updates and configurations of the network elements to optimize performance of the network or provide new features in the network.

6. The method of claim 1, wherein the attribute sets are related to one or more of: number of individual networking features; hardware/software specifics of a network element; or network element operational data indicating one or more of load in packets, load on a central processing unit, or load on memory.

7. The method of claim 1, wherein the device risk heatmap rule is a color classifier function that generates a failure risk indication color as a function of the network telemetry data.

8. The method of claim 1, wherein obtaining the first data and the second data, converting the first data and the second data, and analyzing the first data and the second data are performed by a first computing apparatus in a network support center for one or more customer networks including the network, the network support center being remote from the network, and applying the device risk heatmap rule, aggregating the individual device heatmaps, and instantiating the path or tunnel are performed by a second computing apparatus present in the network or by a network element from among the plurality of network elements present in the network, and further comprising:
sending data describing the device risk heatmap rule from the first computing apparatus in the network support center to the second computing apparatus or to the network element.

9. The method of claim 1, wherein the attribute sets have a plurality of values and respective timestamps and are related to platform hardware/software specifics of the networking feature.

10. The method of claim 1, wherein analyzing the first data and the second data includes:
performing machine learning of the attribute sets and the diagnostic signatures to generate a classifier for the device risk heatmap rule, wherein the device risk heatmap rule is based on network events.

11. A system comprising:
a first computing apparatus comprising a first processor and a first memory, the first computing apparatus being associated with a network support center for one or more customer networks, wherein the first computing apparatus is configured to:
obtain first data related to technical support and operations issues of a network from among the one or more customer networks, the network including a plurality of network elements and second data related to updates and configurations of the network, wherein the first data includes one or more of log files, diagnostic signatures, defect tracking system data, and command line interface show types;
convert the first data and the second data into a plurality of different variables representing attribute sets, at least one attribute set being a non-linear attribute set related to dispersion and variance of a networking feature;
analyze the attribute sets to generate a device risk heatmap rule that determines a level of predictive failure risk as a function of network telemetry data indicative of real-time operations of the network; and
a second computing apparatus associated with the network and comprising a second processor and a second memory, wherein the second computing apparatus is configured to:
receive, from the first computing apparatus, data describing the device risk heatmap rule;
apply the device risk heatmap rule to network telemetry data collected from the network to generate a plurality of individual device heatmaps, each respectively corresponding to one of the plurality of network elements;
aggregate the plurality of individual device heatmaps to create a network heatmap representing a level of predictive failure risk for each of the plurality of network elements in the network and each of a plurality of links in the network, the network heatmap being specific to a topology and architecture of the network; and
cause a path or tunnel in the network to be instantiated based on the network heatmap.

12. The system of claim 11, wherein the second computing apparatus is configured to cause the path or tunnel to be instantiated so as to avoid one or more network elements in the network that have an unacceptable level of predictive failure risk.

13. The system of claim 12, wherein the second computing apparatus is configured to cause the path or tunnel to be instantiated so that all network traffic or a subset of all network traffic avoids the one or more network elements in the network that have the unacceptable level of predictive failure risk, based on the network heatmap and traffic requirements.

14. The system of claim 11, wherein the first computing apparatus is configured to analyze by performing machine learning analysis using as input the attribute sets.

15. The system of claim 11, wherein the second data includes data pertaining to updates and configurations of the network elements to optimize performance of the network or provide new features in the network.

16. The system of claim 11, wherein the attribute sets are related to one or more of: number of individual networking features; hardware/software specifics of a network element; or network element operational data indicating one or more or of load in packets, load on a central processing unit, or load on memory.

17. An apparatus comprising:
a network interface configured to enable network communications;
a memory;
a processor coupled to the network interface and to the memory, wherein the processor is configured to:
collect network telemetry data indicative of real-time operations of a network that includes a plurality of network elements;
apply to the network telemetry data a device risk heatmap rule to generate individual device heatmaps, each respectively corresponding to one of the plurality of network elements;
aggregate the individual device heatmaps to produce a network heatmap specific to a topology and architecture of the network and representing a level of predictive failure risk for each of the plurality of network elements in the network and each of a plurality of links in the network, wherein the device risk heatmap rule determines a level of predictive failure risk in a future as a function of network telemetry data indicative of real-time operations of the network and is generated, from first data related to technical support and operations issues of the network that includes the plurality of network elements and second data related to updates and configurations of the network, by converting the first data and the second data into a plurality of different variables representing attribute sets, at least one attribute set being a non-linear attribute set related to dispersion and variance of a networking feature, the first data including one or more of log files, diagnostic signatures, defect tracking system data, and command line interface show types; and
instantiate a path or tunnel in the network based on the network heatmap.

18. The apparatus of claim 17, wherein the processor is configured to create the path or tunnel in the network so as to avoid one or more network elements in the network that have an unacceptable level of predictive failure risk.

19. The apparatus of claim 18, wherein the processor is configured to create the path or tunnel in the network so that all network traffic or a subset of all network traffic avoids the one or more network elements in the network that have the unacceptable level of predictive failure risk, based on the network heatmap and traffic requirements.

20. The apparatus of claim 17, wherein the device risk heatmap rule is a color classifier function that generates a failure risk indication color as a function of the network telemetry data.

* * * * *